United States Patent
Wasula et al.

(10) Patent No.: US 8,754,948 B2
(45) Date of Patent: Jun. 17, 2014

(54) CUSTOMIZING DIGITAL IMAGE TRANSFER

(75) Inventors: John L. Wasula, Rochester, NY (US); Anthony L. Tintera, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 1777 days.

(21) Appl. No.: 09/990,500

(22) Filed: Nov. 21, 2001

(65) Prior Publication Data

US 2002/0054224 A1    May 9, 2002

Related U.S. Application Data (63) Continuation of application No. PCT/US00/15422, filed on Jun. 2, 2000.

(60) Provisional application No. 60/137,094, filed on Jun. 2, 1999.

(51) Int. Cl.
*H04N 5/225* (2006.01)

(52) U.S. Cl.
USPC ..................... 348/207.1; 348/231.2

(58) Field of Classification Search
USPC ........ 348/207.1, 231.2, 231.99, 231.7, 231.5, 348/552, 231.9, 231.3, 231.6
See application file for complete search history.

(56) References Cited

U.S. PATENT DOCUMENTS

| | | | |
|---|---|---|---|
| 5,477,264 A | 12/1995 | Sarbadhikari et al. | |
| 5,633,678 A | 5/1997 | Parulski et al. | |
| 5,666,159 A | 9/1997 | Parulski et al. | |
| 5,734,425 A | 3/1998 | Takizawa et al. | |
| 5,806,072 A * | 9/1998 | Kuba et al. | 707/200 |
| 5,862,217 A * | 1/1999 | Steinberg et al. | 713/176 |
| 6,167,469 A * | 12/2000 | Safai et al. | 710/62 |
| 6,177,956 B1 * | 1/2001 | Anderson et al. | 348/207.99 |
| 6,433,818 B1 * | 8/2002 | Steinberg et al. | 348/161 |
| 6,496,222 B1 * | 12/2002 | Roberts et al. | 348/231.99 |
| 6,636,259 B1 | 10/2003 | Anderson et al. | |
| 6,715,003 B1 * | 3/2004 | Safai | 710/33 |
| 2002/0191090 A1 * | 12/2002 | Safai | 348/239 |

(Continued)

FOREIGN PATENT DOCUMENTS

EP    0 837 405    4/1998

OTHER PUBLICATIONS

PC Card Standard Release 2.0, published by the Personal Computer Memory Card International Association, Sunnyvale, California, Sep. 1991.
CompactFlash Specification Version 1.3, published by the Compact Flash Association, Palo Alto, California, Aug. 5, 1998.

(Continued)

*Primary Examiner* — Anthony J Daniels (57) ABSTRACT

A digital camera is disclosed for capturing digital images and organizing the captured images for subsequent transfer from the digital camera to an external device that utilizes the digital images. The digital camera includes a database having a plurality of customized profiles, wherein each customized profile contains a plurality of image utilization fields. A user selects one of the plurality of customized profiles from the database. The digital camera further includes a structure for defining a plurality of profile indices respectively corresponding to ones of the plurality of customized profiles, and an image sensor for capturing images. A profile index is associated with at least one captured image to identify the corresponding selected customized profile. The digital camera further includes a memory for receiving and storing the at least one captured image and the corresponding profile index.

20 Claims, 7 Drawing Sheets

| | | |
|---|---|---|
| 1 | PROFILE NAME: DEFAULT | |
| 2 | LOCAL OPTIONS | |
| 3 | DESTINATION: | c: \MY IMAGES |
| 4 | RESOLUTION: | LOW |
| 5 | FILENAME PREFACE: | MyImg |
| 6 | FILENAME SUFFIX: | 01 |
| 7 | IMAGE FORMAT: | JPEG |
| 8 | RUNAPP: | NONE |
| 9 | NOTIFY END TRANSFER: | AUDIBLE |
| 10 | ERASE AFTER TRANSFER: | NO |
| 11 | | |
| 12 | NETWORK OPTIONS | |
| 13 | DESTINATION: | |
| 14 | RESOLUTION: | |
| 15 | FILENAME PREFACE: | |
| 16 | FILENAME SUFFIX: | |
| 17 | IMAGE FORMAT: | |

(56) References Cited

U.S. PATENT DOCUMENTS

| | | |
|---|---|---|
| 2003/0048361 A1* | 3/2003 | Safai .......................... 348/222.1 |
| 2004/0046868 A1* | 3/2004 | Anderson et al. ........ 348/207.11 |
| 2004/0179115 A1* | 9/2004 | Tomat et al. ............... 348/231.6 |
| 2004/0201737 A1* | 10/2004 | Baron et al. ............... 348/231.2 |
| 2005/0012941 A1* | 1/2005 | Takahashi .................... 358/1.2 |
| 2005/0055727 A1* | 3/2005 | Creamer et al. .............. 725/105 |
| 2009/0207254 A1* | 8/2009 | Tomat et al. ............... 348/207.1 |

OTHER PUBLICATIONS

"Digital Still Camera Image File Format (Exif)", version 2.1, Jul. 1998 by the Japan Electronics Industries Dev ment Association (JEIFDA), Tokyo, Japan.

Non-Final Office Action on U.S. Appl. No. 13/102,082, mailed Mar. 8, 2013.

Notice of Allowance on U.S. Appl. No. 13/102,082, mailed Aug. 27, 2013.

* cited by examiner

| | | |
|---|---|---|
| 1 | PROFILE NAME: | JOHN HOME USE |
| 2 | LOCAL OPTIONS | |
| 3 | DESTINATION: | c:\SAM'S 1st BIRTHDAY |
| 4 | RESOLUTION: | LOW |
| 5 | FILENAME PREFACE: | SAM'S 1 BDAY |
| 6 | FILENAME SUFFIX: | 01 |
| 7 | IMAGE FORMAT: | JPEG |
| 8 | RUNAPP: | c:\PROGRAM FILES\PHOTODELUXE [-LOADING] |
| 9 | NOTIFY END TRANSFER: | AUDIBLE |
| 10 | ERASE AFTER TRANSFER: | YES |
| 11 | NETWORK OPTIONS | |
| 12 | DESTINATION: | FTP://FTP.KODAK.PHOTONET/WASULA/ALBUM/SAM'S 1st BIRTHDAY |
| 13 | RESOLUTION: | HIGH |
| 14 | FILENAME PREFACE: | SAM'S 1 BDAY |
| 15 | FILENAME SUFFIX: | 01 |
| 16 | IMAGE FORMAT: | JPEG |

*FIG. 3A*

1  PROFILE NAME: TRIP TO DISNEY
2  LOCAL OPTIONS
3      DESTINATION:              c:\ ← DISNEY TRIP 2000
4      RESOLUTION:               HIGH
5      FILENAME PREFACE:         DISNEY 2000
6      FILENAME SUFFIX:          01
7      IMAGE FORMAT:             JPEG
8      RUNAPP:                   c:\PROGRAM FILES\ADOBE\PHOTOSHOP5.EXE
9      NOTIFY END TRANSFER:      AUDIBLE
10     ERASE AFTER TRANSFER:     NO
11
12 NETWORK OPTIONS
13     DESTINATION:
14     RESOLUTION:
15     FILENAME PREFACE:
16     FILENAME SUFFIX:
17     IMAGE FORMAT:

*FIG. 3B*

```
 1  PROFILE NAME: DEFAULT
 2  LOCAL OPTIONS
 3     DESTINATION:              c:\MY IMAGES
 4     RESOLUTION:               LOW
 5     FILENAME PREFACE:         Myimg
 6     FILENAME SUFFIX:          01
 7     IMAGE FORMAT:             JPEG
 8     RUNAPP:                   NONE
 9     NOTIFY END TRANSFER:      AUDIBLE
10     ERASE AFTER TRANSFER:     NO
11  NETWORK OPTIONS
12     DESTINATION:
13     RESOLUTION:
14     FILENAME PREFACE:
15     FILENAME SUFFIX:
16     IMAGE FORMAT:
```

CUSTOMIZING DIGITAL IMAGE TRANSFER

CROSS REFERENCE TO RELATED APPLICATIONS

The present application claims priority under 35 U.S.C. §120 and 365(c) as a continuation of International Application No. PCT/US00/15422, filed Jun. 2, 2000, which claims priority to U.S. Provisional Patent Application No. 60/137,094, filed Jun. 2, 1999. The disclosure of U.S. Provisional Patent Application No. 60/137,094 is herein incorporated by reference.

FIELD OF THE INVENTION

This invention relates generally to the field of digital cameras, and in particular, to customizing digital images from a digital camera so that the digital images can be transferred to and used by an external device.

BACKGROUND OF THE INVENTION

The user experience concerning the transfer of pictures from a digital camera to an external device, such as a personal computer (PC), has not been positive for a number of reasons. There are numerous steps to perform to initiate an image transfer including connecting the digital camera, initializing the PC, such as running a transfer application on the PC, choosing an album or destination directory for the images, and deleting images off the digital camera. Ultimately, the process can be time consuming if a large number of images needs to be transferred. In addition, the transfer of images from a digital camera to an external device may not be consistent from session to session. The inconsistency results in unorganized images, ineffective use of images, loss of interest in using images, and possible loss of images.

SUMMARY OF THE INVENTION

Accordingly, it is an object of the present invention to facilitate organization of digital images captured by a digital camera for subsequent transfer from the digital camera to an external device that utilizes the digital images.

This object is achieved by a digital camera for capturing digital images and organizing the captured images for subsequent transfer from the digital camera to an external device that utilizes the digital images, comprising:
- (a) means for providing a database having a plurality of customized profiles, wherein each customized profile contains a plurality of image utilization fields;
- (b) means for selecting one of the plurality of customized profiles from the database;
- (c) means for defining a plurality of profile indices respectively corresponding to ones of the plurality of customized profiles;
- (d) an image sensor for capturing images;
- (e) means for associating a profile index with at least one captured image to identify the corresponding selected customized profile; and
- (f) storage means for receiving and storing the at least one captured image and the corresponding profile index.

Advantages

It is an advantage of the present invention to provide a mechanism which enables a custom configured and unattended image transfer from a digital camera to an external device.

It is another advantage of the present invention to permit multiple configurations to be resident on the digital camera.

Attached is an appendix of codes which can be used in the practice of the present invention.

DETAILED DESCRIPTION OF THE INVENTION

Figure 1:
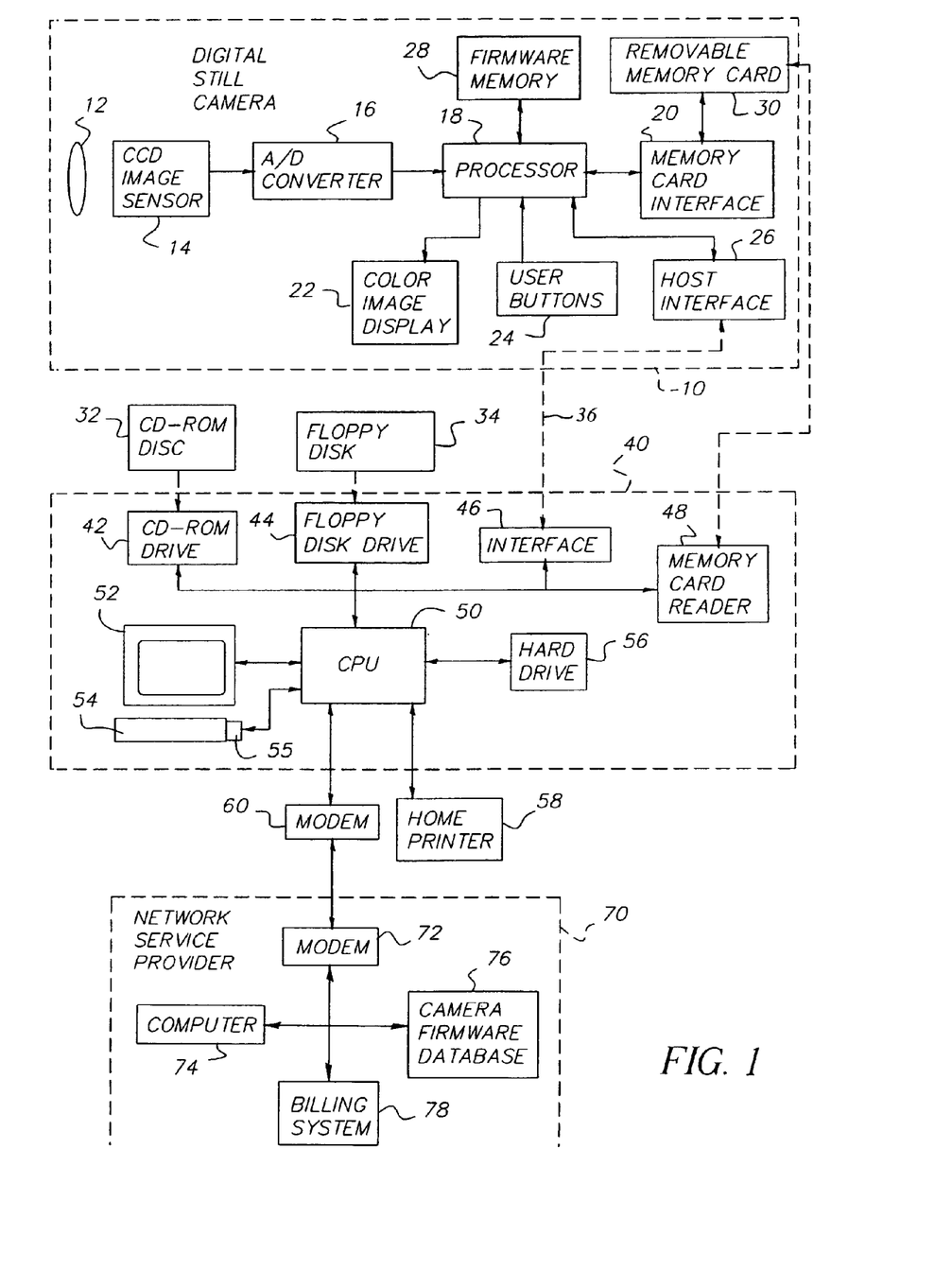
FIG. 1 is a block diagram of a system in accordance with the present invention which enables the customization of image organization and transfer for particular users or events.

FIG. 1 is a block diagram of a digital camera 10, a host computer 40 (external device) and a Network Service Provider 70 which enables the customization of image organization and transfer of digital images from the digital camera 10 to the host computer 40, such as a Dell Dimension XPS M200 personal computer for the images to be utilized. As shown in FIG. 1, the digital camera 10 is supplied along with a compact disc (CD-ROM) 32 or a floppy disk 34.

The digital camera 10 produces digital images that are stored on a removable memory card 30. The digital camera 10 includes a zoom lens 12 having zoom and focus motor drives (not shown), and an adjustable aperture and shutter (not shown). The zoom lens 12 focuses light from a scene (not shown) on an image sensor 14, for example, a single-chip color charge-coupled device (CCD), using the well-known Bayer color filter pattern. The analog output signal from the image sensor 14 is converted to digital data by an analog-to-digital (A/D) converter 16. The digital data is processed by a processor 18 controlled by firmware stored in firmware memory 28, which can be Flash EPROM memory. The processed digital image file is provided to a memory card interface 20 which stores the digital image file on the removable memory card 30. The removable memory card 30, which is well-known to those skilled in the art, can include, for example, a memory card adapted to the PCMCIA card interface standard, as described in the *PC Card Standard, Release 2.0*, published by the Personal Computer Memory Card International Association, Sunnyvale, Calif., September 1991. The removable memory card 30 can also be adapted to the Compact Flash interface standard, such as described in the *CompactFlash Specification Version* 1.3, published by the CompactFlash Association, Palo Alto, Calif., Aug. 5, 1998. Other types of digital memory devices, such as magnetic hard drives, magnetic tape, or optical disks, could alternatively be used to store the digital images.

The processor 18 performs color interpolation followed by color and tone correction, in order to produce rendered sRGB image data. The rendered sRGB image data is then JPEG compressed and stored as a JPEG image file on the removable memory card 30. The processor 18 also creates a reduced resolution or "thumbnail" size image data that is supplied to a color image display 22, such as a liquid crystal display (LCD), which displays the captured image for the user to review. A camera user interface is used to control the digital camera 10. The camera user interface includes a series of user buttons 24 and a graphical user interface (GUI) displayed on the image display 22. The GUI is controlled by the user interface portion of the firmware stored in the firmware memory 28. The camera user interface can also include a digital-to-analog (D/A) converter (not shown) and a miniature speaker (not shown) which makes audible sounds when a new picture is taken, or when the user changes modes or advances to review the next stored image. The digital camera 10 can also include a video output driver (not shown) and connector (not shown) for displaying the captured images on a TV (not shown).

After a series of images has been taken by the digital camera 10 and stored on the removable memory card 30, the removable memory card 30 can be inserted into a memory card reader 48 in the host computer 40. Alternatively, an interface cable 36 can be used to connect between a host interface 26 in the digital camera 10 and a camera interface 46 in the host computer 40. The interface cable 36 can conform to, for example, the well-know universal serial bus (USB) interface specification.

The captured images from the digital camera 10 can be downloaded to the host computer 40 and stored on a hard drive 56 under the control of a central processing unit (CPU) 50 which may be a Pentium processor manufactured by Intel Corporation, Santa Clara, Calif., running the Windows 98 Operating System developed by Microsoft Corporation, Redmond, Wash. The CPU 50 is directly coupled to a display monitor 52, which is used to view the images, and a keyboard 54. A mouse 55 permits the user to readily communicate with the CPU 50. The CPU 50 is in direct communication with a local printer 58, such as an Epson Stylus Photo 700 printer, which produces hard copy prints of the images captured by the digital camera 10.

In accordance with the present invention, a database is provided in firmware stored in the firmware memory 28 of the digital camera 10. The database, which is preferably a profile table, can include a plurality of customized profiles. These customized profiles each contain a plurality of image utilization fields which are used in connection with the transfer of images from the digital camera 10 to the host computer 40 or other external device, and the subsequent utilization of the transferred images. For example, suppose a user wants to upload images to the host computer 40. A user either creates a new customized profile or selects an existing customized profile which defines options for how the image transfer is to be conducted. The customized profile can be produced in advance on the host computer 40 or directly on the digital camera 10 by a user actuating a keyboard 54 or the user interface 24, respectively. Preferably, the digital camera 10 is provided with a profile table containing a default profile which can be customized by the user. Multiple profiles can be produced by a user or users, and such profiles can be selected for appropriate transfer and utilization of the captured images to the host computer 40. These profiles are used in conjunction with a digital image transfer application program resident on the host computer 40, which will be described later.

A profile index is stored in each digital image file, for example, in a location or tag of an "Exif" header of a JPEG compressed image file. This profile index, which is preferably a profile name, indicates the corresponding customized profile that has been selected for the particular captured image. Alternatively, the profile index can be a profile number stored in the digital image file. The "Exif" image format is defined in "Digital Still Camera Image File Format (Exif)" version 2.1, July 1998 by the Japan Electronics Industries Development Association (JEIDA), Tokyo, Japan. This format includes an Exif application segment that stores particular image metadata, for example, the date and time the picture was captured, the lens f/number and other camera settings, and image captions or comments that can be selected or entered by the camera user.

Figure 2A:
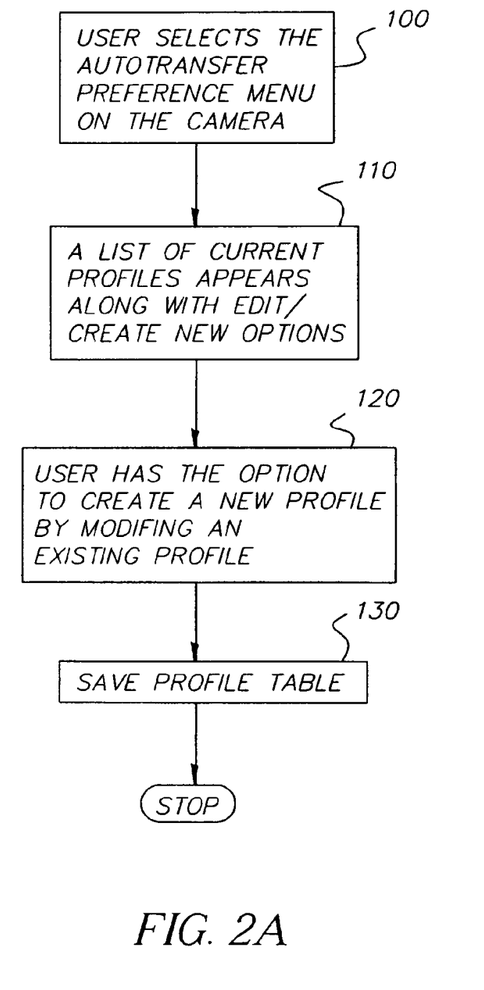
FIGS. 2A and 2B are flow diagrams depicting the steps used in editing an automation profile on the digital camera and on the host computer of FIG. 1, respectively, in accordance with the present invention.
Figure 2B:
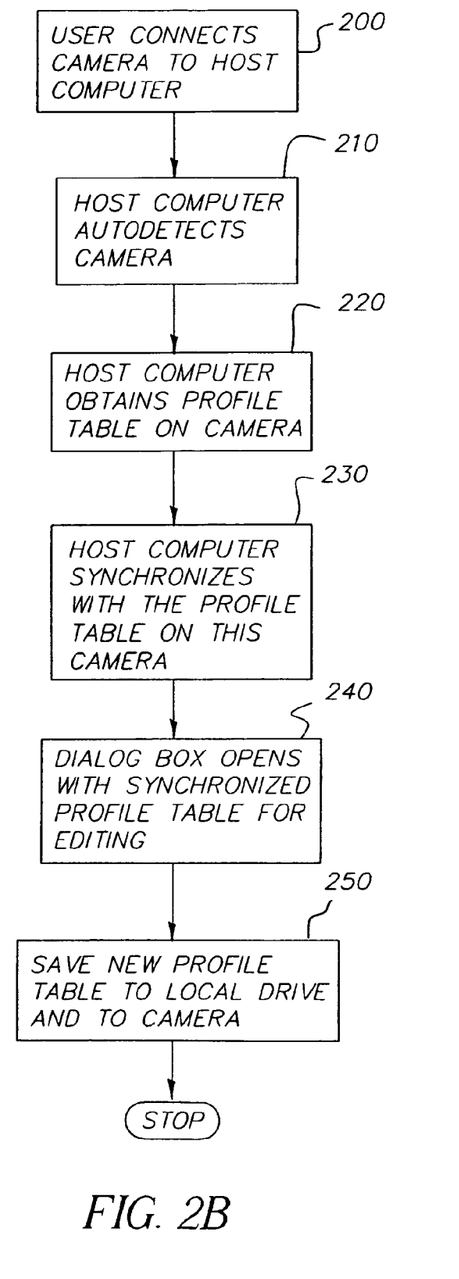
Figure 6:
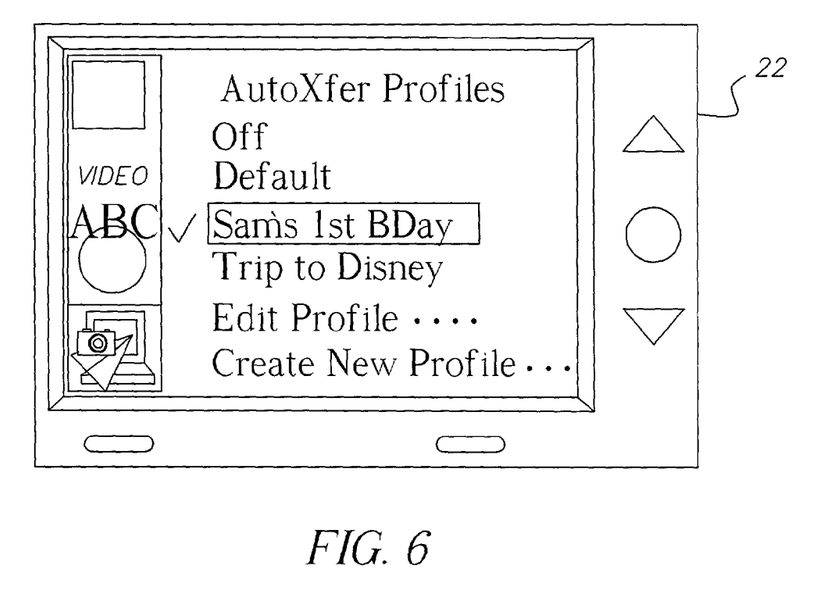
FIG. 6 shows an image display on the digital camera of FIG. 1 with an "Autotransfer Preference Menu" providing a list of profiles and "Edit Profile" and "Create New Profile" options in connection with block 210 of FIG. 2A.

FIGS. 2A and 2B are flow diagrams showing the steps used in creating or editing a customized profile in accordance with the present invention. In particular, FIG. 2A shows the steps used in creating or editing a customized profile directly on the digital camera 10. As shown in block 100, to edit a profile on the digital camera 10, a user selects an "Autotransfer Preference Menu" on the image display 22 of the digital camera 10 by depressing user buttons on the camera user interface 24. A list of current profiles appears on the image display 22 along with an "Edit Profile" option and a "Create New Profile" option (block 110). See FIG. 6 for an example of the "Autotransfer Preference Menu" displayed on the image display 22 of the digital camera 10 containing a list of representative profiles, and the "Edit Profile" and "Create New Profile" options. As shown in block 120 of FIG. 2A, the user can produce an entirely new profile or can create a new profile by modifying an existing profile. Once a new profile has been produced, or an existing profile has been altered, the profile table can be saved on the removable memory card 30 or in the firmware memory 28 shown in FIG. 1 (block 130).

FIG. 2B shows the steps used in producing or editing a customized profile on the host computer 40. As shown in block 200, the user first connects the digital camera 10 to the host computer 40 using the interface cable 36. The host computer 40 detects the presence of the digital camera 10 (block 210) and obtains a profile table on the digital camera 10 (block 220). The host computer 40 then "synchronizes" with the profile table on the particular digital camera 10 (block 230) to ensure that there is one-to-one correspondence between the profile table on the particular digital camera 10 and a profile table resident on the host computer 40. A dialog box opens on the display monitor 52 of the host computer 40 with the synchronized profile table so that individual profiles in the profile table can be edited (block 240). The new profile table can be saved to the hard drive 56 of the host computer 40 and to the digital camera 10 (block 250).

As previously described, each customized profile in the profile table stored in the firmware memory 28 contains a plurality of image utilization fields indicating the desired conditions to be used during the transfer of a captured image from the digital camera 10 to an external device, such as the host computer 40 or the Network Service Provider 70 shown in FIG. 1. Such image utilization fields can include, for example, an event description or title of the captured image, a prefix for the image file name, an index field for the image file name, the format of the image file, a destination directory, and an image editing application software preference. A customized profile will now be described in more detail with reference to an example shown in FIG. 3A. As shown on line 1 of FIG. 3A, the customized profile is entitled "John's Home Use." The local options for the host computer 40 are shown in lines 3-10, and the Network Options for the Network Service Provider 70 are shown in lines 13-17. Lines 2 and 12 are not part of the customized profile, but have been included for clarity of explanation. In this example, the images are to be filed directly to the Kodak Picture Network (KPN) server under the user's account in a folder called "Sam's 1st Birthday" (line 13 of FIG. 3A). Each image file is to be prefaced with "Sam's 1Bday" (line 15 of FIG. 3A) and numerically ordered using the 01 suffix (line 16). The images will be converted to JPEG format (line 17 of FIG. 3A). Lower resolution images are to be stored to the local hard drive 56 on the host computer 40 under the directory "c:\Sam's 1$^{st}$ Birthday" using the same filename and format (line 3 of FIG. 3A). Afterwards, Adobe PhotoDeluxe software is run with all local images loaded (line 8 of FIG. 3A).

Figure 3A:
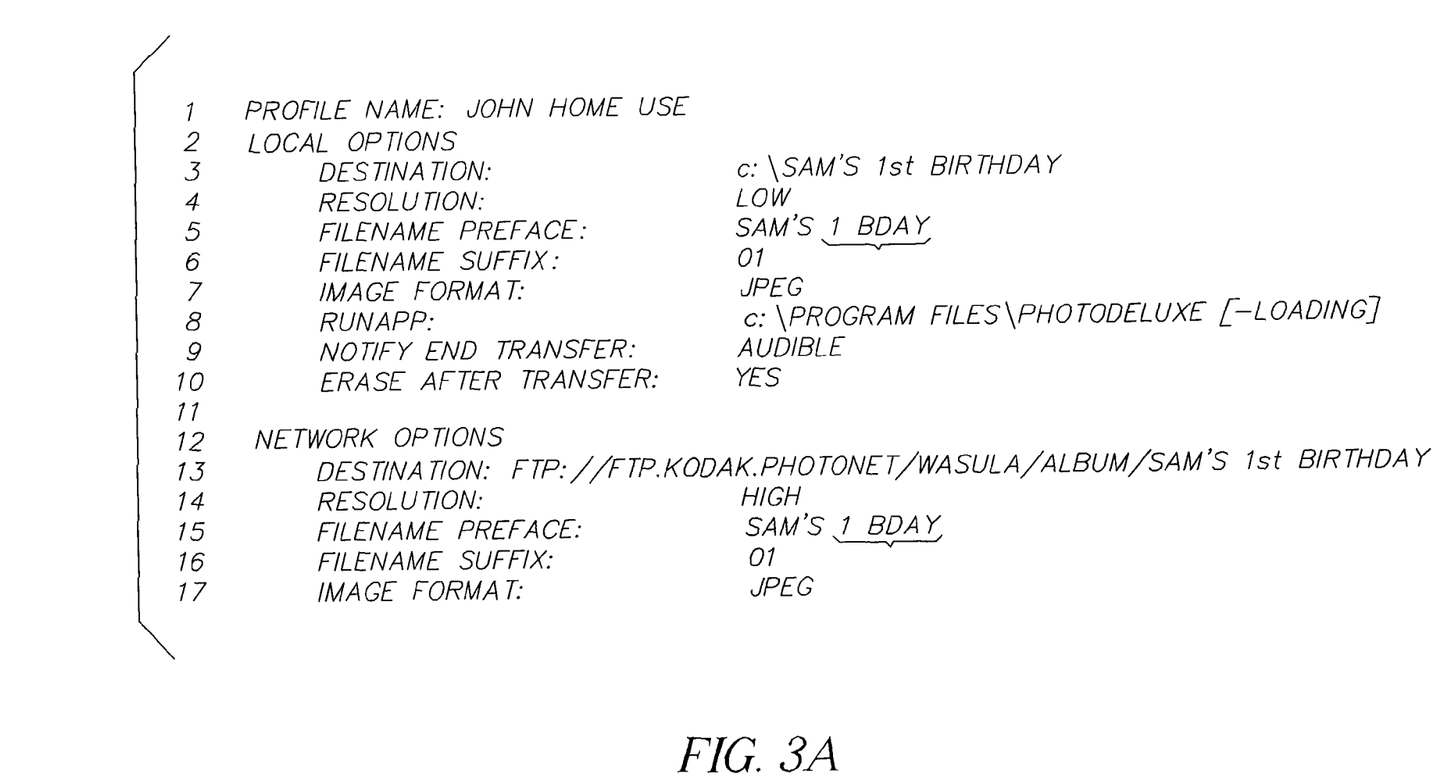
FIGS. 3A and 3B are examples of customized profiles.

When the transfer of the image from the digital camera 10 to the external device has finished, an option of audible notification can be selected to audibly notify the user that the images have been properly transferred so that the user can return to view the images (line 9 of FIG. 3A).

A representative resulting Local destination directory for the customized profile shown in FIG. 3A is as follows:

A representative resulting KPN album is as follows:

The customized profile can be unique to a particular digital camera 10 by using a unique camera identification as an image utilization field in the profile. This provides information which is specific to the particular digital camera 10, as well as a specific user of the digital camera 10. For example, the owner of the digital camera 10 may have a user customized graphical user interface which can be accessed via the customized profile. In addition, the customized profile may be dependent on a camera accessory which is utilized with the particular digital camera 10. The unique camera identification can also serve as a locking mechanism so that only the owner of the particular digital camera 10 can access the customized profile containing the unique camera identification.

Figure 3B:
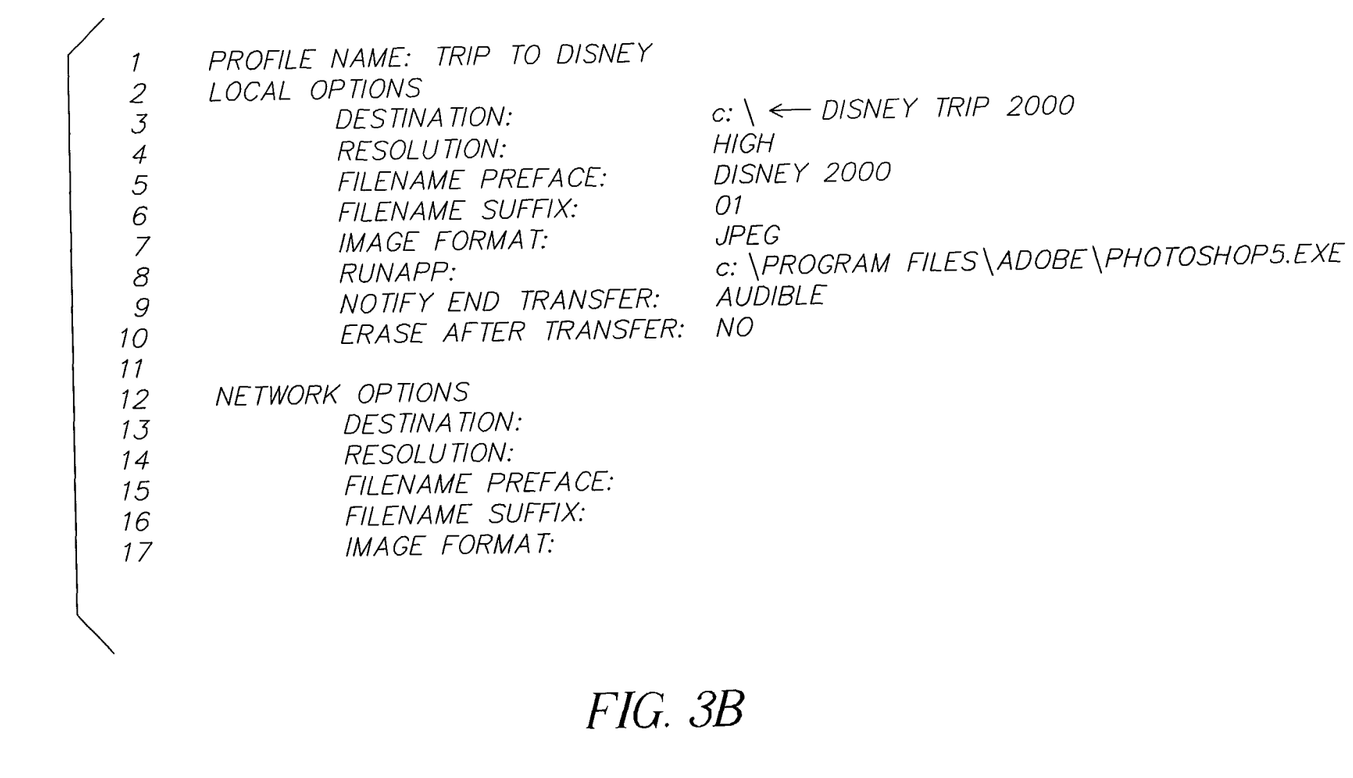
Figure 3C:
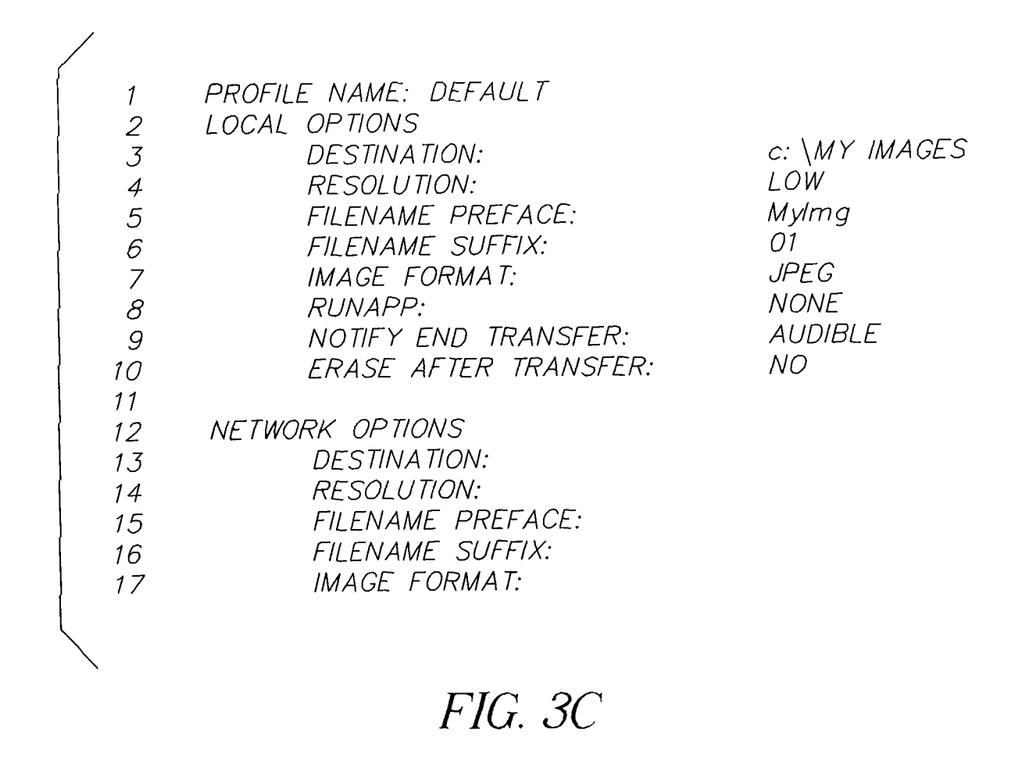
FIG. 3C is an example of a default profile.

FIG. 3B shows an another example of a customized profile entitled "Trip to Disney", and FIG. 3C shows an example of a default profile. The "Trip to Disney" and the default profile examples do not involve any Network operations, and therefore, the image utilization fields for the Network Options in lines 13-17 are blank.

Figure 4:
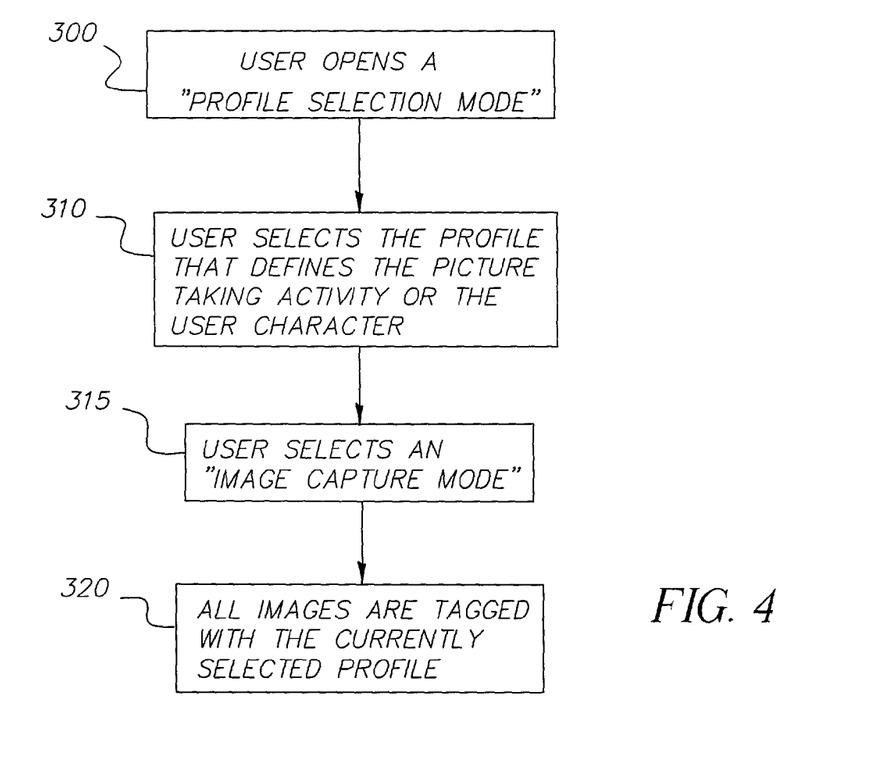
FIG. 4 is a flow diagram depicting the steps used in capturing an image with the digital camera of FIG. 1 in accordance with the present invention.

Turning now to FIG. 4, a flow diagram is shown which depicts the steps used in capturing an image with the digital camera 10. These images can be subsequently transferred for utilization by an external device in accordance with the present invention. As shown in block 300, prior to image capture, the user depresses user buttons on the camera user interface 24 to cause the processor 18 to select a "Profile Selection Mode." In this mode, the user then selects a desired profile from a list of existing profiles viewed on the image display 22 of the digital camera 10 (block 310). By again actuating user buttons on the camera user interface 24, the user then selects an "Image Capture Mode" to enable images to be captured by the digital camera 10 and associated with the selected profile (block 315). Each captured image is tagged with the currently selected profile and stored on the removable memory card 30 (block 320).

Figure 5:
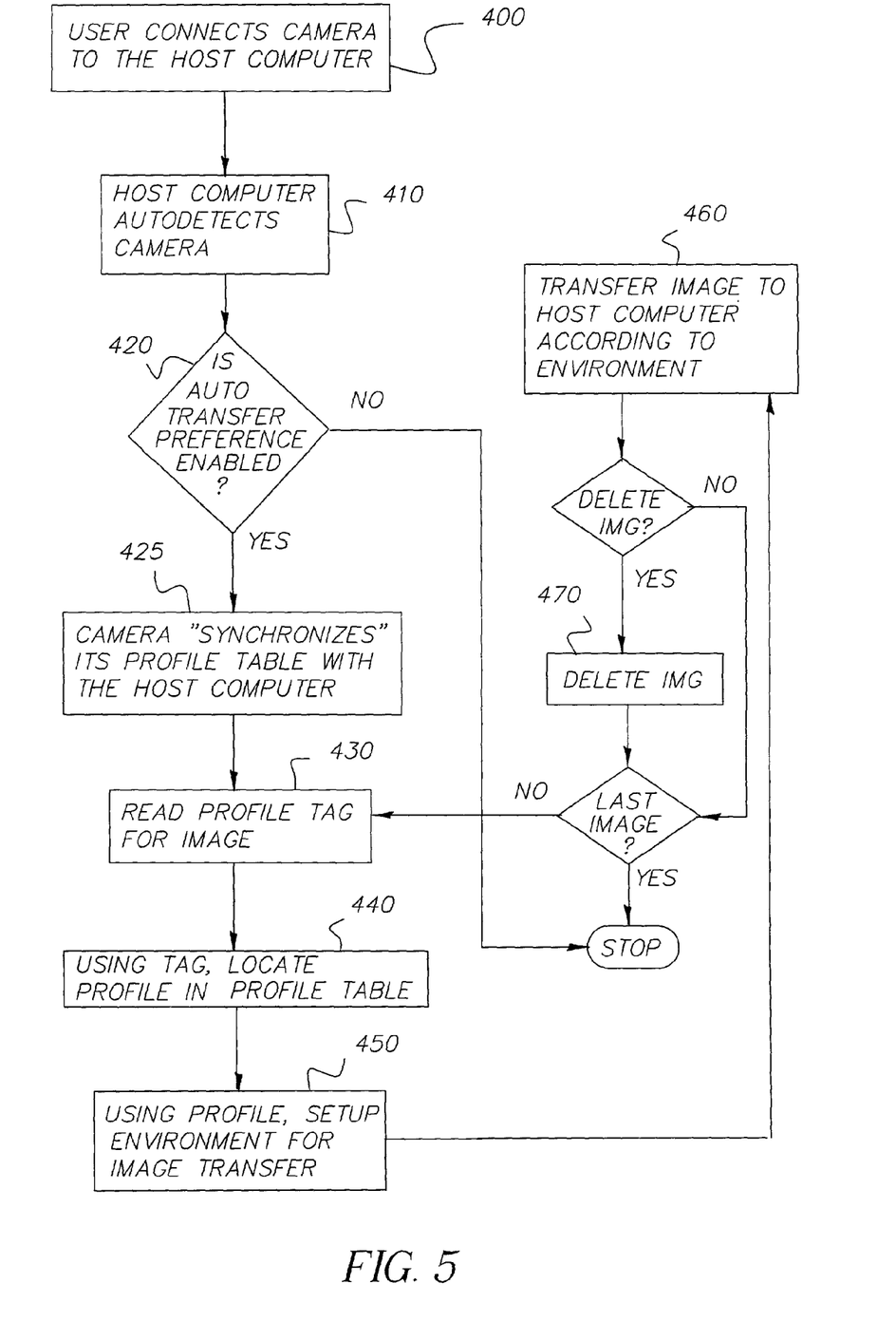
FIG. 5 is a flow diagram depicting the steps used in automated image transfer in accordance with the present invention.

Prior to image transfer from the digital camera 10 to the host computer 40, a digital image transfer application program supplied with the digital camera 10 is uploaded to the hard drive 56 of the host computer 40. The digital image transfer application program is continuously operated by the CPU 50. FIG. 5 is a flow diagram showing the steps used in the automated transfer of images from the digital camera 10 to the host computer 40. As shown in block 400, a user connects the digital camera 10 to the host computer 40 using the interface cable 36 (such as a USB cable). The digital image transfer application program on the hard drive 56 of the host computer 40 automatically detects the presence of the digital camera 10 (block 410). The USB driver, provided as part of the Windows 98 Operating System, interrupts the CPU 50 of the host computer 40 so that the CPU 50 activates the digital image transfer process.

The host computer 40 asks the digital camera 10 if it has the ability to automatically transfer captured images to the host computer 40. If so, then the host computer 40 asks the digital camera 10 if it has an "Autotransfer Preference Mode" enabled (block 420). The "Autotransfer Preference Mode" can be enabled using the user interface 24 on the digital camera 10, such as by selecting a profile via an "Autotransfer Preference Menu" (such as "Sam's 1st BDay" shown in FIG. 6). As shown in block 425, the digital image transfer application program sends a command to the digital camera 10 requesting the profile table from the firmware memory 28. The digital camera 10 sends the entire profile table to the digital image transfer application program in the CPU 50. In a well-known manner, the digital image transfer application program ensures that there is one-to-one correspondence between the profile table on the digital camera 10 and a profile table resident on the host computer 40 (block 425).

The digital image transfer application program then requests the transfer of the first image stored on the removable memory card 30 to the host computer 40. The digital image transfer application program first reads the tag in the Exif header of the image file to be transferred (block 430) and identifies the corresponding customized profile for that image using the profile index (block 440). The digital image transfer application program sets up the appropriate image transfer conditions (block 450) and transfers the image from the digital camera 10 to the host computer 40 or other external device (block 460) in accordance with the image utilization fields defined in the customized profile. In particular, the digital image transfer application program first looks at the destination directory field (e.g., directory or album), in the appropriate customized profile (e.g., line 3 in FIG. 3A), and if such destination directory does not exist, creates that directory, for example, on either the hard drive 56 of the host computer 40, or on a hard disk space on the Network Service Provider 70. The digital image transfer application program then modifies, as appropriate, the image name using the filename preface and suffix fields (e.g., lines 5 and 6, respectively, in FIG. 3A), the image format using the format field (e.g., line 7 in FIG. 3A), and resolution using the resolution field (e.g., line 4 in FIG. 3A), and stores the transferred image in the appropriate destination directory (e.g., line 3 in FIG. 3A). After the image is transferred and stored in a destination directory, the digital image transfer application program looks for an "image editing application preference" field (e.g., "RunApp" line 8 in FIG. 3A) in the profile of that image, for example, Adobe PhotoDeluxe software. If such a field exists, that preferred image editing application is automatically launched and the image is pulled into that application for the user to access. The image can then be deleted from the removable memory card 30 of the digital camera 10 (block 470), according to the "Erase After Transfer" field (line 10 in FIG. 3A). Alternatively, a global preference can be stored in the firmware memory 28 of the digital camera 10 and used for all transfers. It should be noted that if the image is deleted as a global preference, all images get deleted after transfer to the host computer 40 regardless of the individual profiles. The above process is repeated for all captured images.

While the preferred embodiment includes a plurality of different profiles that can be selected by the user for various images (e.g., profiles shown in FIGS. 3A-3C), in an alternative embodiment, only a single profile is used (e.g., all images are downloaded using the profile in FIG. 3A). The single profile can, of course, be customized by the user either using the user interface of the digital camera 10 or the host computer 40.

Further, while the preferred embodiment allows the profile to be customized and stored using both the digital camera 10 and the host computer 40, in another alternative embodiment, profiles are created and stored only on the host computer 40. A default profile can be selected or created by the user on the host computer 40 and stored on the hard drive 56 of the host computer 40. This profile is then used for the images downloaded from the digital camera 10 to the host computer 40.

In accordance with the present invention, a profile can be locked so that only the owner of the profile can upload images to the external device. The locking and unlocking of a profile can be accomplished by the use of a password. Such a password would be stored in the firmware memory 28 of the digital camera 10.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The present invention has been described in detail with particular reference to certain preferred embodiments thereof, but it will be understood that variations and modifications can be effected within the spirit and scope of the invention.

| Parts List | |
|---|---|
| 10 | digital camera |
| 12 | lens |
| 14 | image sensor |
| 16 | analog-to-digital converter |
| 18 | processor |
| 20 | memory card interface |
| 22 | image display |
| 24 | user buttons |
| 26 | host interface |
| 28 | firmware memory |
| 30 | removable memory card |
| 32 | CD-ROM disc |
| 34 | Floppy disk |
| 36 | interface cable |
| 40 | host computer |
| 42 | CD-ROM drive |
| 44 | Floppy disk drive |
| 46 | interface |
| 48 | memory card reader |
| 50 | central processing unit |
| 52 | display monitor |
| 54 | keyboard |
| 55 | mouse |
| 56 | hard drive |
| 58 | home printer |
| 60 | modem |
| 70 | Network Service Provider |

APPENDIX

Below is a code snippet written in Visual C++ that is used in the digital image transfer application program which would run on the host computer upon detection of the camera connection.

```
void CMainFrame::DC210_DoAutoTransfer( )
{
    OSErr    err;
    HCURSOR  hcursor;
    int iChoice;
    int iAutoElement;
    CString cstrTitle;
    CString cstrDir;
    CString cstrFilePrefix;
    CString cstrApp;
    char cAppArg;
    int flgDir;
    int flgFilePrefix;
    int flgApp;
    int iPicCnt;
    LPTSTR szFileName;
    LPTSTR szPathName;
    LPTSTR szLastSlashPtr;
    LPTSTR szAppArgsPtr;
    LPTSTR szAppArguments;
    KillTimer( AUTOPOLL_TIMER);
    //wake up camera
    if((err = OpenCamera( )) == DC210_CameraNotConnected)
    {
        CloseCamera( );
```

APPENDIX

```
        SetTimer(AUTOPOLL_TIMER, AUTOPOLL_INTERVAL, NULL); //Polling timer to find camera
        return;
    }
    //for thumbnail display
    long size = DC210_ThumbWidth * DC210_ThumbHeight * 3L;
    HGLOBAL      hbs;
    if( (hbs=GlobalAlloc(GHND, size)) == NULL) {
        return;
    }
    dcPictInfo.ThumbPtr = (HCHARPTR)GlobalLock(hbs);
    // Get the Automation Choice, if "Off" then do nothing
    err = DC210_GetAutomation(&dcCamera, (m_pApp->dcAutomation));
    err = DC210_GetAutomationChoice(&dcCamera, &iChoice);
    if(iChoice)
    {
    // format utilization fields for use in transferring images to PC
        szFileName = (LPTSTR)malloc(sizeof(TCHAR)*256);
        szPathName = (LPTSTR)malloc(sizeof(TCHAR)*256);
        szAppArguments = (LPTSTR)malloc(sizeof(TCHAR)*1024);
        iAutoElement = iChoice – 1; // set the automation index
        // Assign AutoElement Properties
        cstrTitle = (m_pApp->dcAutomation)[iAutoElement].szName; // Title of element
        cstrDir = (m_pApp->dcAutomation)[iAutoElement].szDir; // Directory to save images
        cstrFilePrefix = (m_pApp->dcAutomation)[iAutoElement].szFileName; // Prefix to modify each
image filename
        cstrApp =(m_pApp->dcAutomation)[iAutoElement].szApp; // Image Editing App to start
        // Determine active fields
        flgDir = 1; // assume active
        flgFilePrefix = 1;
        flgApp = 1;
        if(cstrDir.IsEmpty( ) || cstrDir=="  ")
        {
            flgDir = 0;
            cstrDir = DEFAULT_AUTOTRANSFER_DIR;
        }
        if(cstrFilePrefix.IsEmpty( ) || cstrFilePrefix==" ")
        {
            flgFilePrefix = 0;
            cstrDir = DEFAULT_AUTOTRANSFER_FILE_PREFIX;
        }
        if(cstrApp.IsEmpty( ) || cstrApp==" ")
        {
            flgApp = 0;
        }
        else
        {
            strcpy( szPathName, (LPCSTR)cstrApp );
            // Extract options for App
            szAppArgsPtr = strrchr( szPathName, '-');
            cAppArg = *(szAppArgsPtr+1);
            *(szAppArgsPtr) = '\0';
            strcpy( szAppArguments, szPathName );
            cstrApp.Format("%s",szAppArguments);
            // Extract pathname to App
            szLastSlashPtr = strrchr( szPathName, '\\');
            *(szLastSlashPtr+1) = '\0';
            //strcpy( szAppArguments, cstrApp );
        }
        err = DC210_GetStatus(&dcCamera, &dcStatus, (VOIDPTR)&dc200Status);
        // Get all the images
        for(iPicCnt=0;iPicCnt<gDCStatusPtr->NumPictTaken;iPicCnt++)
        {
            pictNum = iPicCnt+1;
            err = DC210_GetCameraPictInfo(&dcCamera, pictNum, thumbFlag, &dcImgProcData,
        &dcPictInfo, (VOIDPTR)&dc200PictInfo);
            ConvertThumbnailToBitmap(this,&dcPictInfo, &dcImgProcData);
            memset((void *)szFileName, NULL, sizeof(szFileName));
            m_cstrImgFileSave.Format("Transferring Image %s
%d.jpg",(LPCSTR)cstrFilePrefix,pictNum);
            wsprintf((LPSTR)szFileName, "%s\\%s%d.jpg",
(LPCSTR)cstrDir,(LPCSTR)cstrFilePrefix,pictNum);
            GetAutoPicture(szFileName); // get a single image
            // build command line argument - file list
            if( (flgApp) && (cAppArg=='f') && ((strlen(szAppArguments)+strlen(szFileName)+2) <
1024))
            {
                strcat( szAppArguments," ");
                strcat( szAppArguments, szFileName );
```

-continued

APPENDIX

```
            }
        }
        // build command line argument - directory
        if( (flgApp) && (cAppArg=='d'))
        {
            strcat( szAppArguments, " " );
            strcat( szAppArguments, (LPCSTR)cstrDir );
        }
        // If App has been specified then run it and import pictures
        if(0) //debug
        //if(flgApp)
        {
            STARTUPINFO StartupInfo;
            PROCESS_INFORMATION ProcessInformation;
            DWORD fdwCreate = 0;        // flags for CreateProcess
            memset(&StartupInfo,0,sizeof(StartupInfo));
            StartupInfo.cb = sizeof(StartupInfo);
            fdwCreate |= CREATE_UNICODE_ENVIRONMENT;
        // run the preferred image application as indicated by the customized profile
            BOOL crtproc = CreateProcess( (LPCTSTR)cstrApp,
                                                        szAppArguments,//szFileName,
                                                        NULL,
                                                        NULL,
                                                        TRUE,
                                                        fdwCreate,
                                                        NULL,
                                                        szPathName,
                                                        &StartupInfo,
                                                        &ProcessInformation
            );
            DWORD dwError = GetLastError( );
        }
        free(szFileName);
        free(szPathName);
        free(szAppArguments);
    }
    // Release Thumbnail
    GlobalUnlock(hbs);
    GlobalFree(hbs);
    dcPictInfo.ThumbPtr = NULL;
    if( gHThumbBitmap != NULL) {
        DeleteObject(gHThumbBitmap);
        gHThumbBitmap = NULL;
    }
    // put the camera to sleep
    CloseCamera( );
    SetTimer(AUTOPOLL_TIMER, AUTOPOLL_INTERVAL, NULL); // Polling timer to find camera
    DoneFlag = 1; //debug
}
Below are code modules of commands used in the camera firmware in order to
support the transfer of images to the host computer.
1) Send the Profile Table to the host computer:

SBYTE ol_send_automation_table(SBYTE *rcv_buf)
{
    SBYTE answer;
    unsigned int uiDataCnt;
    unsigned int ui256Cnt;
    unsigned int ui256RemainderCnt;
    unsigned int uiBlkSzToSend;
    unsigned int uiCnt;
    UBYTE iData[256+5];
    int ATAFile;
    DCSTAT strDosStat;
    char FileName [16];
    // acknowledge host computer
    if(ol_dl_send_1byte(SYSC_ACK)){
        return(COM_ERR);
    }
    /* Read the flashcard for automation data */
    strcpy(FileName,AUTOMATION_FILE);
    ATAFile = DCDosOpen(DCATACard, FileName O_RDONLY);
    if( ATAFile < 0 ) {
        return(ERROR);
    }
    DCDosFstat (ATAFile, &strDosStat);
    uiDataCnt =(unsigned int)strDosStat.st_size;
    ui256Cnt = (unsigned int)(uiDataCnt/256);
```

-continued

APPENDIX

```
        ui256RemainderCnt = (unsigned int)(uiDataCnt%256);
        for(uiCnt= 0;uiCnt<256;uiCnt++)
            iData[uiCnt] = 0x00;
        iData[0] = ui256Cnt + 1;
        // read automation profile file
        DCDosRead(ATAFile, &iData[1], 255);
        ol_send_pack( iData, PACK_SIZE3, PACK_SIZE3);
        // send profile to host computer
        for(uiCnt=1;uiCnt<=ui256Cnt;uiCnt++)
        {
            if(uiCnt==ui256Cnt)
                uiBlkSzToSend = (ui256RemainderCnt+1);
            else
                uiBlkSzToSend = 256;
            for(uiCnt=0;uiCnt<256;uiCnt++)
                iData[uiCnt] = 0x00;
            DCDosRead(ATAFile, &iData[0], uiBlkSzToSend);
            ol_send_pack( iData, PACK_SIZE3, PACK_SIZE3);
        }
        DCFSTimeSet(ATAFile);
        DCDosClose(ATAFile);
        return(OK);
}
2) Receive the Profile Table from the host computer:

SBYTE ol_retrieve_automation table(SBYTE *rcv_buf)
{
    unsigned int uiCnt;
    unsigned int ui256Cnt;
    unsigned int uiByteCnt;
    unsigned int ui256RemainderCnt;
    unsigned int uiBlkSzToWrite;
    SBYTE answer;
    SBYTE pcb;
    int ATAFile;
    char FileName[16];
    UBYTEiData[256+5];
    UBYTE   card_status;
    char dummy[5];
    // acknowledge the host computer
    if(ol_dl_send_1byte(SYSC_ACK)){
        return(COM_ERR);
    }
    // receive the first data block of profile from the host computer
    answer = ol_receive_pack( iData, 255, &pcb);
    strcpy(FileName,AUTOMATION_FILE);
    DCDosDelete(DCATACard, FileName);
    // open the removable memory card
    ATAFile = DCDosOpen(DCATACard, FileName, O_CREAT|O_WRONLY);
    if( ATAFile < 0 ){
        return(ERROR);
    }
    uiByteCnt = (unsigned int)(iData[0]<<8);
    uiByteCnt |= (unsigned int)(iData[1]);
    // determine how many data blocks to transfer
    ui256Cnt = (unsigned int)(uiByteCnt/256);
    ui256RemainderCnt = (unsigned int)(uiByteCnt%256);
    if(ui256Cnt)
    {
        uiBlkSzToWrite = 253;
        DCDosWsite(ATAFile, &iData[2], uiBlkSzToWrite);
        for(uiCnt=1;uiCnt<=ui256Cnt;uiCnt++)
        {
            if(uiCnt==ui256Cnt)
                uiBlkSzToWrite = ui256RemainderCnt;
            else
                uiBlkszToWrite = 255;
    // read profile data and write it to the removable memory card
            answer = ol_receive_pack( iData, 255, &pcb);
            DCDosWrite(ATAFile, &iData[0], uiBlkSzToWrite);
        }
    }
    else
    {
        uiBlkSzToWrite = ui256RemainderCnt;
        DCDosWrite(ATAFile, &iData[2], uiBlkSzToWrite);
    }
    DCFSTimeSet(ATAFile);
```

-continued

APPENDIX

```
    // close the removable memory card
    DCDosClose(ATAFile);
    return(OK);
}
3) Send the Profile currently selected on the digital camera to the host computer:

SBYTE ol_snd_auto_choice(SBYTE *rcv_buf)
{
    SBYTE bAutoChoice;
    static struct camera_value CameraValues;
    if(ol_dl_send_1byte(SYSC_ACK)){
        return(COM_ERR);
    }
    (void)get_camera_value(& CameraValues);
    bAutoChoice = (SBYTE)CameraValues.autotransfer_on;
    ol_dl_send_1byte(bAutoChoice);
    return(OK);
}
4) Receive the new Profile selection from the host computer:

SBYTE ol_rcv_auto_choice(SBYTE *rcv_buf)
    UBYTE bAutoChoice;
    if(ol_dl_send_1byte(SYSC_ACK)){
        return(COM_ERR);
    }
    bAutoChoice = (UBYTE)(*(rcv_buf + 3));
    set_autotransfer( bAutoChoice );
    return(OK);
}
```

What is claimed is:

1. A method comprising:
transferring a plurality of image files from a memory of a digital imaging device to an external device, wherein the external device comprises an external device database;
accessing a set of image utilization fields of at least one customizable profile, the at least one customizable profile being stored on a database of the digital imaging device;
modifying each transferred image file by the external device in accordance with the set of image utilization fields; and
storing the modified transferred image file along with the set of image utilization fields in the external device for subsequent use;
wherein one of the set of image utilization fields is a unique imaging device identification that is specific to a particular digital imaging device and that permits access to at least one of the customized profiles.

2. The method according to claim 1, wherein the set of image utilization fields is stored on the external device.

3. The method according to claim 1, further comprising editing the customizable profile in the external device.

4. The method according to claim 1, wherein the set of image utilization fields includes a deletion field and further including the step of deleting the transferred image files from the memory in accordance with the deletion field after storage of such image files in the external device.

5. The method according to claim 1, wherein the set image utilization fields includes an image editing preference application software field designating a software application stored in the external device and further including the step of applying the designated user preferred application software to the modified transferred captured image.

6. The method of claim 1, wherein the database includes a plurality of profiles.

7. The method of claim 1, wherein the set of utilization fields includes a filename suffix field or filename prefix field that is appended to the imaging device filenames.

8. The method of claim 1, wherein the external device is a network service provider.

9. A system comprising one or processors configured to:
transfer a plurality of image flies from a memory of a digital imaging device to an external device, wherein the external device comprises an external device database; and
transfer a set of image utilization fields of at least one customizable profile, the at least one customizable profile being stored on a database of the digital imaging device;
wherein the external device modifies each transferred image file in accordance with the set of image utilization fields, wherein the external device stores the modified transferred image file along with the set of image utilization fields for subsequent use, and wherein one of the set of image utilization fields is a unique imaging device identification that is specific to a particular digital imaging device and that permits access to at least one of the customized profiles.

10. The system of claim 9, wherein the set of image utilization fields is stored on the external device.

11. The system of claim 9, wherein the one or more processors are further configured to edit the customizable profile in the external device.

12. The system of claim 9, wherein the set of image utilization fields includes a deletion field and further including the step of deleting the transferred image files from the memory in accordance with the deletion field after storage of such image files in the external device.

13. The system of claim 9, wherein the set image utilization fields includes an image editing preference application software field designating a software application stored in the external device, and wherein the external device is configured to apply the designated user preferred application software to the modified transferred captured image.

14. The system of claim 9, wherein the database includes a plurality of profiles.

15. The system of claim 9, wherein the set of utilization fields includes a filename suffix field or filename prefix field that is appended to the imaging device filenames.

16. The system of claim 9, wherein the external device is a network service provider.

17. A non-transitory computer-readable medium having instructions stored thereon, the instructions comprising:
   instructions to transfer a plurality of image files from a memory of the digital imaging device to an external device, wherein the external device comprises an external device database; and
   instructions to transfer a set of image utilization fields of at least one customizable profile, the at least one customizable profile being stored on a database of the digital imaging device;
   wherein the external device modifies each transferred image file in accordance with the set of image utilization fields, wherein the external device stores the modified transferred image file along with the set of image utilization fields for subsequent use, and wherein one of the set of image utilization fields is a unique imaging device identification that is specific to a particular digital imaging device and that permits access to at least one of the customized profiles.

18. The non-transitory computer-readable medium of claim 17, wherein the set of image utilization fields is stored on the external device.

19. The non-transitory computer-readable medium of claim 17, wherein the instructions further comprise instructions edit the customizable profile in the external device.

20. The non-transitory computer-readable medium of claim 17, wherein the set of image utilization fields includes a deletion field and further including the step of deleting the transferred image files from the memory in accordance with the deletion field after storage of such image files in the external device.

* * * * *